(12) United States Patent
Belet

(10) Patent No.: US 9,891,637 B2
(45) Date of Patent: Feb. 13, 2018

(54) METHOD FOR POWERING A MODULE INCORPORATED WITHIN A SYSTEM-ON-A-CHIP AND CORRESPONDING ELECTRONIC DEVICE

(71) Applicant: STMicroelectronics (Grand Ouest) SAS, Delarue (FR)

(72) Inventor: Christophe Belet, Parigne l'eveque (FR)

(73) Assignee: STMicroelectronics (Grand Ouest) SAS, Delarue (FR)

( * ) Notice: Subject to any disclaimer, the term of this patent is extended or adjusted under 35 U.S.C. 154(b) by 0 days.

(21) Appl. No.: 15/696,459

(22) Filed: Sep. 6, 2017

(65) Prior Publication Data

US 2017/0364109 A1  Dec. 21, 2017

Related U.S. Application Data

(62) Division of application No. 14/958,583, filed on Dec. 3, 2015.

(30) Foreign Application Priority Data

May 5, 2015  (FR) ..................................... 15 53994

(51) Int. Cl.
| | | |
|---|---|---|
| G05F 1/10 | (2006.01) | |
| G05F 3/02 | (2006.01) | |
| G05F 1/46 | (2006.01) | |
| G06F 1/26 | (2006.01) | |

(52) U.S. Cl.
CPC . *G05F 1/46* (2013.01); *G06F 1/26* (2013.01)

(58) Field of Classification Search
CPC ...................................... G05F 1/46; G06F 1/26
USPC ................................................... 327/538–543
See application file for complete search history.

(56) References Cited

U.S. PATENT DOCUMENTS

| 5,671,149 A | 9/1997 | Brown |
| 7,447,924 B2 | 11/2008 | May |
| 2004/0233589 A1 | 11/2004 | Dewey |
| 2006/0126367 A1 | 6/2006 | Hesterman |
| 2008/0315831 A1 | 12/2008 | Li et al. |
| 2012/0194149 A1 | 8/2012 | Noda |
| 2015/0028942 A1 | 1/2015 | Fukuda |

OTHER PUBLICATIONS

INPI Search Report and Written Opinion for FR 1553994 dated Feb. 10, 2016 (10 pages).

*Primary Examiner* — Lincoln Donovan
*Assistant Examiner* — Metasebia Retebo
(74) *Attorney, Agent, or Firm* — Gardere Wynne Sewell LLP

(57) ABSTRACT

A module incorporated within a system-on-a-chip operating in a steady-state power supply phase is powered by supplying to the module a regulated power supply voltage obtained from a feedback control loop. The receives a main power supply voltage and a negative feedback voltage. The negative feedback voltage is generated inside the system-on-a-chip starting from an effective supply voltage of the module and from a setpoint signal corresponding to a desired regulated power supply voltage.

13 Claims, 6 Drawing Sheets

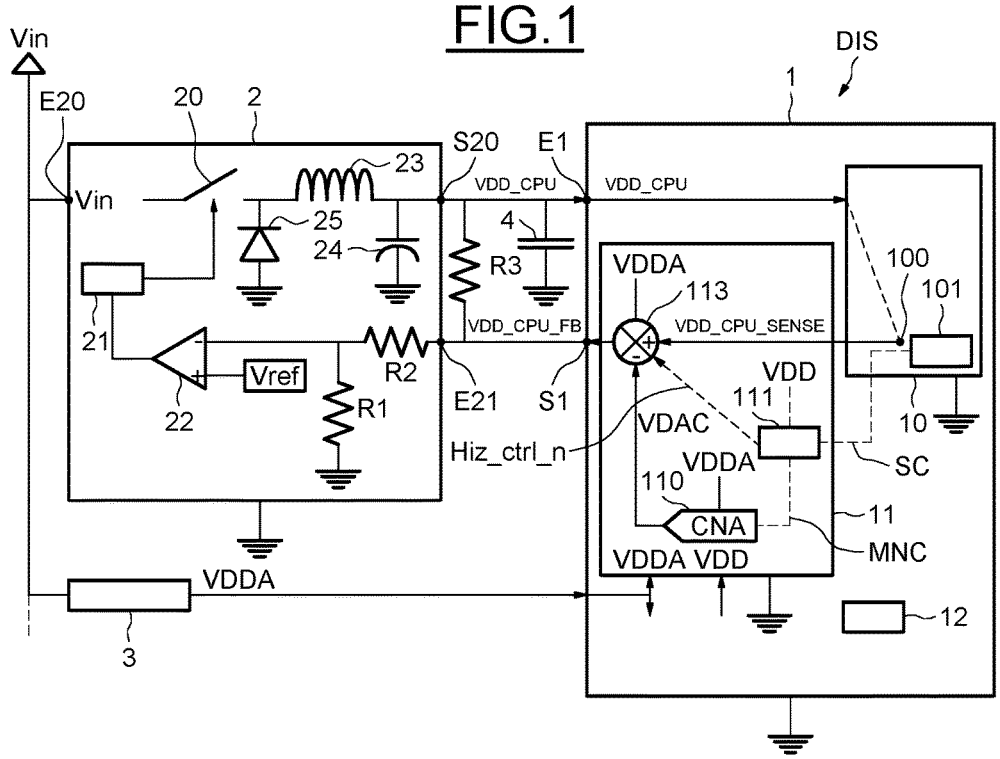
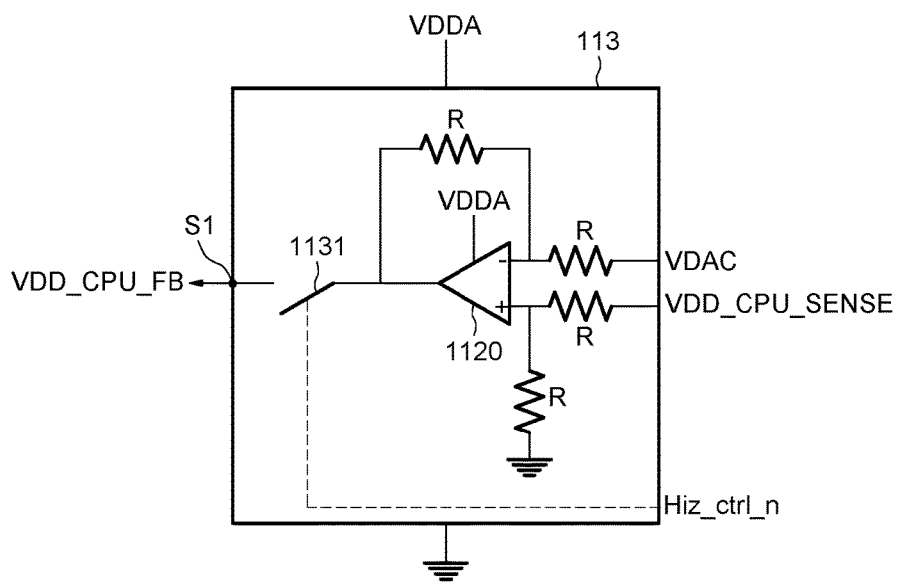

METHOD FOR POWERING A MODULE INCORPORATED WITHIN A SYSTEM-ON-A-CHIP AND CORRESPONDING ELECTRONIC DEVICE

CROSS REFERENCE TO RELATED APPLICATIONS

This application is a divisional of U.S. patent application Ser. No. 14/958,583 filed Dec. 3, 2015, which claims priority from French Application for Patent No. 1553994 filed May 5, 2015, the disclosures of which are incorporated by reference.

TECHNICAL FIELD

Various embodiments relate to electrical circuits and, notably, the management of the power supply for a system-on-a-chip (known as an 'SoC') with the purpose of simplifying the control of the adaptive voltage scaling (or AVS) and of improving the response time of the dynamic voltage and frequency scaling (or DVFS).

BACKGROUND

Currently, numerous electronic devices, such as cellular mobile telephones, tablets, decoders, etc., and more generally onboard devices, have power saving modes which allow the power consumption to be reduced and the heat dissipation to be limited.

Conventionally, the power distribution networks (or PDN) for electronic devices comprise a set of switching regulators and/or a power management unit (or PMU). This allows the power supply to the various areas of the system-on-a-chip to be distributed efficiently.

Furthermore, in such a manner as to increase the precision of voltage regulation for sensitive electronic devices such as systems-on-a-chip, the idea is to provide closed-loop control for the voltage regulator with a negative feedback voltage coming from inside the device, for example that taken from the power grid. This allows the voltage losses, due notably to the printed circuit board (or PCB) onto which the system-on-a-chip is mounted and to the packaging, to be compensated.

Generally speaking, a system-on-a-chip, notably when it incorporates a central processing unit (or CPU), is the assembly with the highest power consumption within a product and modes dedicated to power saving are provided.

The methods used most commonly for implementing these power saving modes are adaptive voltage scaling (or AVS) and dynamic voltage and frequency scaling (or DVFS) which are both aimed at adapting the various power supply voltages of the various parts of the system-on-a-chip to their lowest possible values taking into account the state of the system-on-a-chip.

More precisely, a desired value of regulated power supply voltage is determined by the system-on-a-chip as a function of a set of criteria such as the frequency of the clock signal supplying the central processing unit, the temperature, the variations of certain parameters due to the process of fabrication on silicon, etc.

This desired regulated power supply voltage is subsequently used in the feedback control loop.

For this purpose, dedicated circuits for carrying out the voltage adaptation are used.

Amongst these circuits may notably be mentioned those, for example, incorporated into portable devices such as mobile telephones, tablets, whose architecture contains a power management unit (PMU) containing a control interface connected to a homologous control interface of the system-on-a-chip via a specific bus, for example an SPI or I$^2$C bus, together with regulators. Programmable regulators may also be used.

However, such an architecture proves to be costly and it requires a dedicated interface for the control bus which can occupy several input/output terminals of the system-on-a-chip.

A second type of possible architecture includes the use of a module delivering pulses with a modulated width (pulse width modulation: PWM) associated with a low-pass filter in such a manner as to eliminate the AC modulation and to only keep the DC voltage.

However, such an architecture requires a suitable design and the implementation of a low-pass filter external to the system-on-a-chip and introduces a time delay between the moment when the desired regulated power supply voltage is calculated and the moment when the correction is applied in the regulator.

However, such a delay is not acceptable when the voltage must be dynamically adapted (DVFS).

SUMMARY

According to one embodiment and its implementation, a power supply is provided for a module incorporated within a system-on-a-chip, for example a central processing unit (CPU), without the use of pulse-width-modulated signals, nor a specific bus of the SPI or I$^2$C type for example, and using conventional regulators, in other words non-programmable, with the same performance characteristics as those obtained with programmable regulators.

According to one aspect, a method is provided for powering a module incorporated within a system-on-a-chip, comprising a steady-state power supply phase (which follows a power-up phase) comprising the supply to the module of a regulated power supply voltage obtained from a feedback control loop receiving a main power supply voltage and a negative feedback voltage, this negative feedback voltage being generated inside the system-on-a-chip starting from an effective supply voltage of the module and from a setpoint signal corresponding to a desired regulated power supply voltage.

Thus, according to this aspect, the negative feedback voltage is generated inside the system-on-a-chip which simplifies the fabrication and notably avoids the use of a low-pass filter or of a specific bus connected to a power management unit (PMU).

According to one embodiment, the generation of the negative feedback voltage comprises a conversion of a setpoint digital word, taken from the setpoint signal, into a voltage offset analog signal.

This voltage offset analog signal can then either be summed with the effective supply voltage or else this voltage offset analog signal can be subtracted from the effective supply voltage.

The method according to this aspect furthermore comprises a power-up phase of the system-on-a-chip during which making the regulation operate in open loop mode is avoided.

Thus, according to one possible embodiment, the power-up phase comprises the placing into a high impedance of the setpoint output of the system-on-a-chip designed to deliver the negative feedback voltage in steady-state mode, and the establishment of a temporary feedback control loop using a resistor connected between the power supply input of the system-on-a-chip receiving the regulated power supply voltage and the setpoint output.

The method then advantageously comprises the placing of the output into a low impedance during the transition between the power-up phase and the steady-state power supply phase, in such a manner as to re-establish the feedback control loop going via the system-on-a-chip.

According to another possible embodiment, the power-up phase can comprise the direct delivery of the effective supply voltage to the setpoint output.

According to another aspect, an electronic device is provided, comprising: a system-on-a-chip comprising a power supply input for receiving a regulated power supply voltage, a module, for example a central processing unit (CPU), intended to be powered by the regulated power supply voltage, control means configured for generating a setpoint signal corresponding to a desired regulated power supply voltage for the module, a voltage adaptation circuit configured for generating a negative feedback voltage starting from an effective supply voltage of the module and from the setpoint signal, and a setpoint output for delivering the negative feedback voltage, and voltage regulation means having a regulation output coupled to the power supply input, a negative feedback input coupled to the setpoint output and configured for delivering the regulated power supply voltage to the regulation output starting from a main power supply voltage and from the negative feedback voltage.

According to one embodiment, the regulation means comprise a switch-mode regulator comprising a switching means, connected between a main input for receiving the main power supply voltage and the regulation output, controllable by a control signal coming from an output signal of a comparator having a first comparator input designed to be connected to a reference voltage and a second comparator input coupled to the negative feedback input via a divider bridge.

According to one variant embodiment, the voltage adaptation circuit comprises a digital-analog converter designed to deliver, in the presence of a setpoint digital word taken from the setpoint signal, a voltage offset analog signal and an adder configured for adding the voltage offset analog signal and the effective supply voltage and thus obtaining the negative feedback voltage.

According to another possible variant embodiment, the voltage adaptation circuit comprises a digital-analog converter designed to deliver, in the presence of a setpoint digital word taken from the setpoint signal, a voltage offset analog signal and a subtractor configured for subtracting the voltage offset analog signal from the effective supply voltage and thus obtaining the negative feedback voltage.

The device furthermore advantageously comprises protection means configured for avoiding, when the device is powered up, an operation of the regulation means in open loop mode.

According to one possible embodiment, the protection means comprise a resistor connected between the power supply input and the setpoint output and a controllable switch, connected between the output of the subtractor and the setpoint output, designed to be in an open state as long as the voltage adaptation circuit is not powered and in a closed state when the adaptation circuit is powered.

According to another possible embodiment, the protection means comprise a controllable switch configured for shunting the adder in such a manner as to deliver the effective supply voltage to the setpoint output as long as the voltage adaptation circuit is not powered.

The device may also furthermore comprise auto-power supply means for the voltage adaptation circuit.

BRIEF DESCRIPTION OF THE DRAWINGS

Others advantages and features of the invention will become apparent from the detailed description of non-limiting embodiments and their implementation, and from the appended drawings in which:

FIGS. 1 to 11 illustrate schematically various embodiments and their implementation.

DETAILED DESCRIPTION

Figure 3:
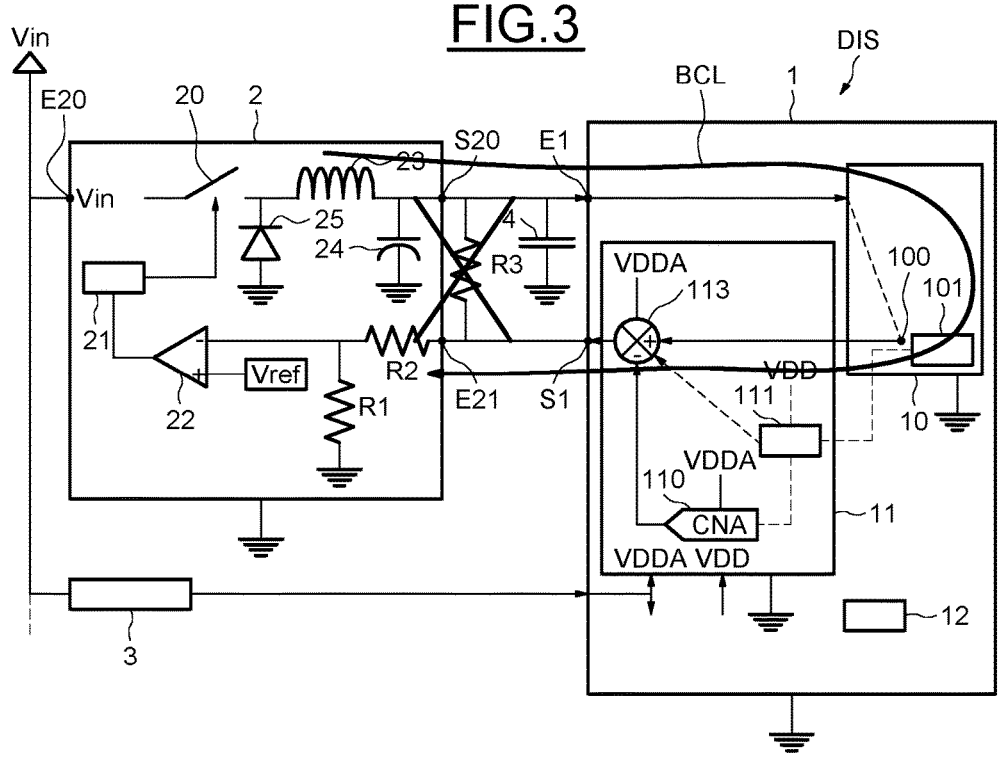

In FIG. 1, the reference DIS denotes an electronic device comprising a system-on-a-chip (SOC) 1 including, in the present case, a module 10 formed by a central processing unit (CPU).

The system-on-a-chip 1 furthermore comprises other modules which have been represented schematically under the reference 12.

The system-on-a-chip 1 comprises a power supply input E1 for receiving a regulated power supply voltage VDD_CPU intended to power the module 10.

A capacitor 4, intended for the high frequency filtering of the activity of the central processing unit, is generally connected between the input E1 and ground.

The module 10 here comprises control means 101, for example a software module executed by the CPU, configured for generating a setpoint signal SC corresponding to a desired regulated power supply voltage.

The system-on-a-chip 1 further comprises a voltage adaptation circuit 11 configured for generating a negative feedback voltage VDD_CPU_FB starting from an effective supply voltage of the module VDD_CPU_SENSE and from a voltage offset analog signal VDAC obtained, as will be seen in more detail hereinafter, by a digital-analog conversion of a setpoint digital word MNC taken from the setpoint signal SC.

For this purpose, the voltage adaptation circuit here comprises a subtractor 113 configured for subtracting the signal VDAC from the effective supply voltage of the module VDD_CPU_SENSE.

The effective supply voltage is measured inside the module 10, for example on a power grid 100.

It should, at this point, be noted here that the effective supply voltage VDD_CPU_SENSE will eventually be the desired regulated power supply voltage after processing in regulation means 2, the structure of which will be described in more detail hereinafter.

The signal VDAC is a DC voltage offset obtained, as indicated hereinbefore, by a digital-analog conversion of the setpoint word MNC delivered by a control block 111, in a digital-analog converter (CNA) 110.

The control block is formed, for example, by a logic circuit.

The voltage range of the digital-analog converter 110 is equal to (VDD_CPU_max-VDD_CPU_min) where VDD_CPU_min is the minimum voltage that can be applied to the module 10 and VDD_CPU_max is the maximum voltage that can be applied to the module 10.

The increment in voltage (or 'voltage step') depends on the granularity required for the voltage adaptation.

In this embodiment, the converter 110 is powered by the positive voltage VDDA.

As a consequence, the output of the converter 110 produces a positive voltage which obviates the need for the addition of a negative voltage able to be generated by a switch-mode regulator of the negative charge pump type.

The regulation means 2 here comprise a non-programmable switch-mode regulator circuit, in this case a voltage step-down switch-mode regulator.

The switch-mode regulator 2 comprises, for this purpose, a switch controllable by a control logic 21 receiving the output signal from an error amplifier or comparator 22.

The non-inverting input of the error amplifier 22 is connected to a source of reference voltage Vref and the inverting input is connected to a negative feedback input E21 of the regulation means 2 via a divider bridge R1, R2. The negative feedback input E21 is connected to the setpoint output S1 and will therefore receive the negative feedback voltage VDD_CPU_FB.

A first terminal of the switch 20 is connected to a power supply main input E20 designed to receive a main power supply voltage Vin. The other terminal of the switch 20 is connected to the regulation output S20 of the regulation means 2 via a diode 25, an inductor 23 and a capacitor 24.

It will be noted here that, even if the divider bridge R1, R2, the inductor 23, the capacitor 24 and the diode 25 do not form part of the switch-mode regulator per se, they are nevertheless considered here as forming part of the regulation means 2 in the wider sense of the term.

The regulation output S20 delivers the regulated power supply voltage VDD_CPU.

Furthermore, a resistor R3, whose function will be considered in more detail hereinafter, is connected between the input E1 and the output S1 of the system-on-a-chip 1.

In the example described here, another regulator 3 delivers, starting from the main power supply voltage Vin, a voltage VDDA intended to supply the analog part of the system-on-a-chip 1, and notably certain elements of the voltage adaptation circuit 11.

Lastly, a power supply voltage VDD designed to supply the control block 111 generating the setpoint word MNC originates from an internal power supply of the system-on-a-chip or from an external power supply, for example another regulator of the type of the regulator 3.

The control block 111 is also configured for delivering a control signal Hiz_CTRL_n so as to control a switch connected to the output of the subtractor 113.

If reference is now more particularly made to FIG. 2, it can be seen that the subtractor 113 here comprises a differential amplifier 1120 whose inverting input receives the signal VDAC via a resistor R and whose non-inverting input receives the signal VDD_CPU_SENSE via another resistance R.

The amplifier 1120 is powered by the voltage VDDA and the output of the amplifier 1120 is connected to the setpoint output S1 via the switch 1131 controlled by the signal Hiz_CTRL_n.

As a result, when the switch 1131 is open, the setpoint output S1 is at a high impedance, whereas when the switch is closed, the output S1 is at a low impedance.

Reference is now more particularly made to FIG. 3 in order to illustrate the voltage regulation in power supply steady-state mode.

As indicated hereinbefore, the regulation means 2 deliver the regulated power supply voltage VDD_CPU to the input E1 of the system-on-a-chip 1.

The voltage VDD_CPU_FB is defined by the equation (1) hereinbelow:

$$VDD\_CPU\_FB = VDD\_CPU\_SENSE - VDAC \qquad (1)$$

in which the voltage VCC_CPU_SENSE represents both the effective supply voltage of the module 100 but also the new desired regulated power supply voltage (after passing through the feedback control loop).

Furthermore, the voltage VDD_CPU_FB is defined by the equation (2) hereinbelow:

$$VDD\_CPU\_FB = (R1+R2)Vref/R1 \qquad (2)$$

From the equations (1) and (2) hereinabove, it can be seen that the voltages VDD_CPU_SENSE and VDAC are mutually connected by the equation (3) hereinbelow:

$$VDD\_CPU\_SENSE = VDAC + (R1+R2)Vref/R1 \qquad (3)$$

Furthermore, the resistors R1 and R2 of the divider bridge are calculated in such a manner that the equation (4) hereinbelow is satisfied:

$$VDD\_CPU\_SENSE = VDD\_CPU\_\min + VDAC \qquad (4)$$

It should be noted here that, as illustrated in FIG. 3, the resistor R3 may be ignored because the output S1 is at a low impedance (switch 1131 closed).

Accordingly, the voltage adaptation, illustrated by the loop BCL in FIG. 3, operates in the following manner.

When there is a request for a change of power supply voltage (for example a new DVFS point of operation), the control means 101 determine a new desired power supply voltage VDD_CPU_SENSE.

The control means 101 therefore send the setpoint signal SC corresponding to this new desired regulated power supply voltage to the control block 111 which generates the setpoint word NMC in such a manner that the offset signal VDAC satisfies the equation (3) hereinbefore.

The digital-analog converter 110 performs this conversion over a certain period of time.

The signal VDAC is delivered to the subtractor 113 which delivers the negative feedback voltage VDD_CPU_FB at its output, which satisfies the equation (1) hereinbefore.

The regulation means 2 then regulate the voltage at the output S20 such that the regulated voltage VDD_CPU reaches the new desired regulated power supply voltage VDD_CPU_SENSE.

The new desired regulated voltage thus obtained VDD_CPU_SENSE then becomes the effective supply voltage present on the power grid 100 of the module 10.

The transition between the sending of the setpoint signal SC and the obtaining of the new desired regulated power supply voltage is very fast and mainly depends on:
- the conversion time, which naturally depends on the design of the digital-analog converter, but which is typically of the order of a few microseconds, and
- the response time of the regulation means, which depends on the bandwidth itself linked to the performance of the regulator, but which is also typically of the order of a few microseconds.

During the power-up phase, under the assumption that the voltage adaptation circuit 11 is first to be powered up, for example by the regulator 3, then there is no need to take any particular precautions.

However, in order to avoid any design constraints, the device DIS is designed in such a manner that the various power-up phases of the various components of this device may be carried out in any given order.

In this case, it is advantageous to provide protection means configured for avoiding an operation of the regulation means in open loop mode during the power-up phase.

Indeed, if it is assumed that the regulation means 2 are the first to start up and that the voltage VDD_CPU is established before other regulators start up, such as the regulator 3 which provides the power supply voltage VDDA for the voltage adaptation circuit 11, then the voltage VDD_CPU would not be regulated and could increase up to the voltage Vin causing the immediate destruction of the module 10. Indeed, the voltage Vin can be around 5 volts, whereas the regulated power supply voltage VDD_CPU admissible for the module 10 may be limited to 1 volt for example.

Figure 4:
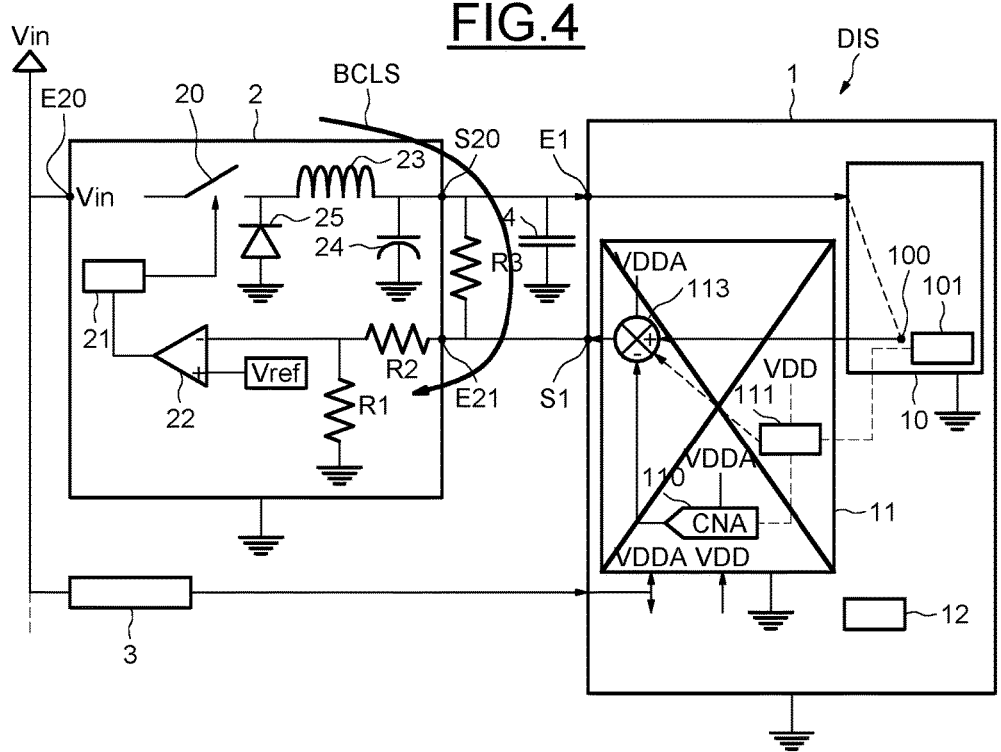

Also, in this embodiment, as illustrated in FIG. 4, during the power-up phase, the resistor R3 allows a temporary feedback control loop BCLS to be formed.

The value of the resistor R3 is chosen in such a manner that the regulated voltage VDD_CPU is higher than the voltage VDD_CPU_min so as to guarantee a correct initialization of the system-on-a-chip, since the voltage losses across the printed circuit board (PCB), the packaging of the system-on-a-chip and the power grid are not compensated until the voltage adaptation circuit 11 is in operation.

Also, during this power-up phase, in order for the resistor R3 to allow the feedback of the regulation means, the setpoint output S1 is placed at a high impedance (switch 1131 open).

Thus, during this power-up phase and until the operation of the voltage adaptation circuit 11, reset by the module 10, the regulated power supply voltage provided at the output S20 is equal to VDD_CPU_pu and is defined by the equation 5 hereinbelow:

$$VDD\_CPU\_pu = (R1+R2+R3)Vref/R1 \qquad (5)$$

The power-up sequence is then as follows.

It is assumed that, initially, no power supply voltage is present.

The power supply voltage Vin is available for example from a charger connected to a device, for example a cellular mobile telephone, incorporating the device DIS.

All the regulators of the device start up in no particular order and their respective regulated output voltage is established.

When the regulation means 2 start up and the power supply voltage delivered at the output S20 is established, this voltage is regulated by the temporary loop BCLS so as to take the value VDD_CPU_pu defined by the equation (5) hereinabove.

Then, when all the regulators of the device have delivered their regulated power supply voltage and the reset pin of the system-on-a-chip is disabled, the power supply voltages VDD and VDDA of the voltage adaptation circuit 11 are available.

During the boot-up sequence of the system-on-a-chip, the control means 101 reset the voltage adaptation circuit 11 by sending the setpoint signal SC to the control block 111 so as to reset and send a command to the digital-analog converter 110 to eventually produce the desired regulated power supply voltage.

Furthermore, the control block 111 closes the switch 1131 which places the output S1 at a low impedance.

From this point on, the value of the resistor R3 becomes negligible relative to the value of the output impedance of the differential amplifier 1120.

Then, the regulation sequence can then be carried out as described hereinbefore with reference to FIG. 3.

Reference is now more particularly made to FIGS. 5 to 8 in order to illustrate another embodiment of the device DIS.

Figure 5:
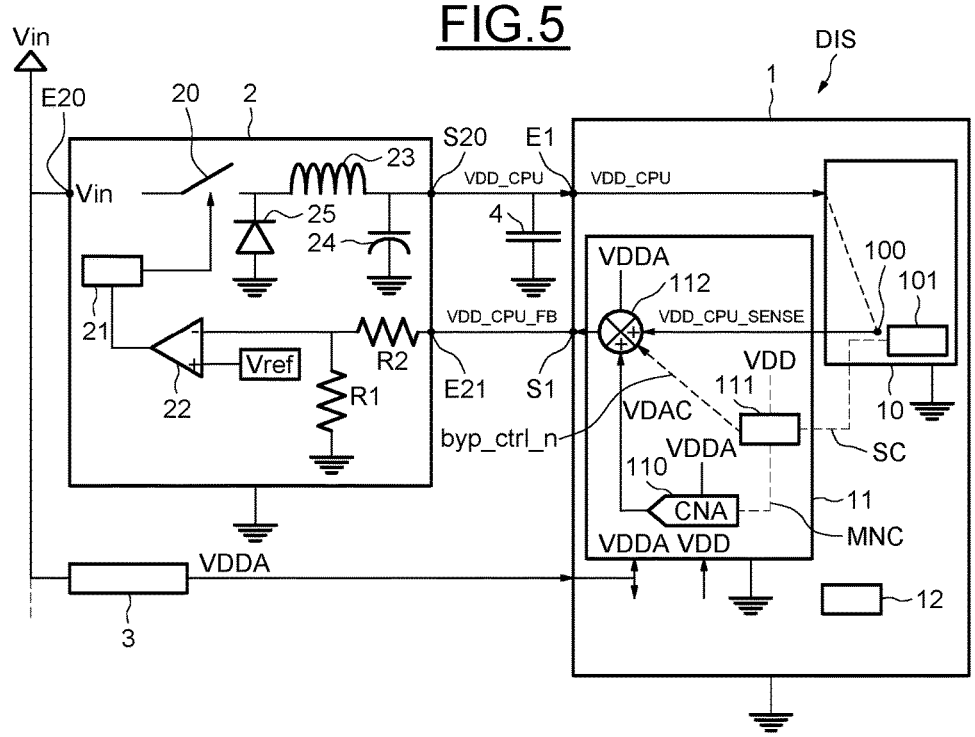

The embodiment in FIG. 5 differs from that in FIG. 1 by the fact that the subtractor 113 is replaced here by an adder 112 receiving, on the one hand, the effective supply voltage VDD_CPU_SENSE and, on the other hand, the analog voltage offset signal VDAC. Furthermore, the resistor R3, which was an element of the protection means, external to the system-on-a-chip, is eliminated.

Figure 6:
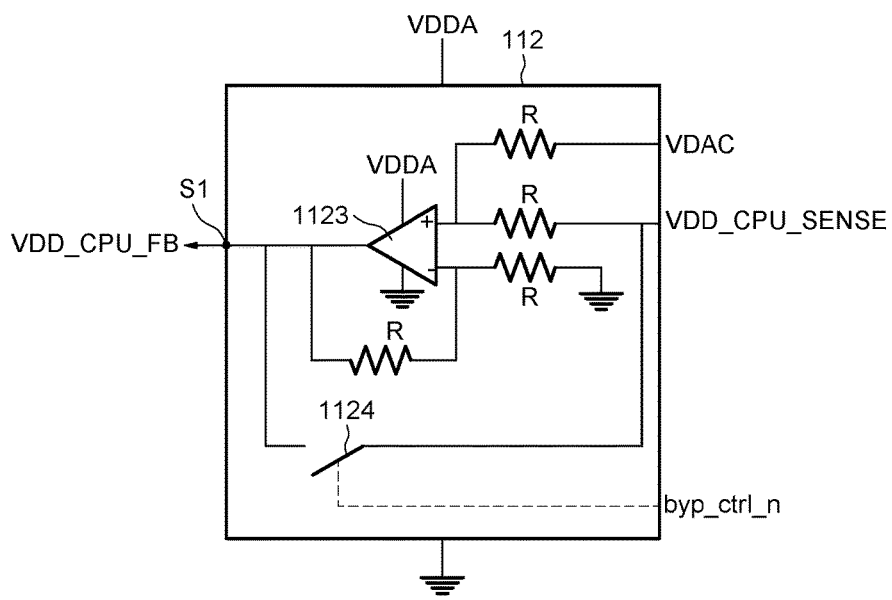

As illustrated more precisely in FIG. 6, the adder 112 here comprises an operational amplifier 1123 configured as an adder and receiving on its non-inverting input the voltages VDAC and VDD_CPU_SENSE via two resistors R.

Furthermore, a switch 1124 is connected between the input of the adder receiving the voltage VDD_CPU_SENSE and the output of the operational amplifier 1023. This switch 1124 is controlled by a signal byp_crtl_n delivered by the control block 111.

Thus, when the switch 1124 is in the closed position, it acts as a "by-pass" and the voltage VDD_CPU_SENSE is delivered directly to the output of the adder 112 (setpoint output S1).

In view of the fact that the adder 112 replaces the subtractor 113, the equations (1), (3) and (4) hereinbefore are respectively replaced by the equations (6), (7) and (8) hereinafter:

$$VDD\_CPU\_FB = VDD\_CPU\_SENSE + VDAC \qquad (6)$$

$$VDD\_CPU\_SENSE = (VRef(R1+R2)/R1) - VDAC \qquad (7)$$

$$VDD\_CPU\_SENSE = VDD\_CPU\_max - VDAC \qquad (8)$$

Outside of the power-up phase, in other words during the steady-state power supply phase, the regulation means 2 form the feedback loop BCL in FIG. 7 and the regulation sequence is as follows.

When there is a request for a change of voltage from the power supply (for example a new point of operation DVFS), the control means 101 determine a new desired regulated power supply voltage.

The block 101 therefore sends the setpoint signal SC corresponding to this new desired regulated power supply voltage to the control block 111 which generates the setpoint word MNC in such a manner that the offset signal VDAC satisfies the equation (7) hereinbefore.

The digital-analog converter 110 carries out this conversion during a certain period of time.

The signal VDAC is delivered to the adder 112 which delivers at its output the negative feedback voltage VDD_CPU_FB which satisfies the equation (6) hereinbefore.

The regulation means 2 then regulate the voltage at the output S20 in such a manner that the regulated voltage VDD_CPU reaches the new desired regulated power supply voltage VDD_CPU_SENSE.

Here again, the new desired regulated voltage thus obtained VDD_CPU_SENSE then becomes the effective supply voltage present on the power grid 100 of the module 10.

In an analogous manner to what has been explained with reference to the embodiment in FIG. 1, the transition between the sending of the setpoint signal SC and the obtaining of the new desired regulated power supply voltage is here again very fast, typically of the order of a few microseconds.

Here again, if it is not desired to impose particular design constraints and to allow the establishment of the various power supply voltages of the device in any given order, during the power-up phase, operating the regulation means 2 in open loop mode should be avoided.

In this embodiment, this protection is obtained by closing the switch 1124 in the power-up phase so as to shunt the adder 112 and to deliver the voltage VDD_CPU_SENSE directly to the setpoint output S1.

By analogy to what has been written with reference to the preceding embodiment, during the power up until the voltage adaptation circuit 11 is operational, the regulated power supply voltage delivered to the output S20 is given by the formula (9) hereinbelow:

$$VDD\_CPU\_pu=(R1+R2)Vref/R1 \quad (9)$$

Figure 8:
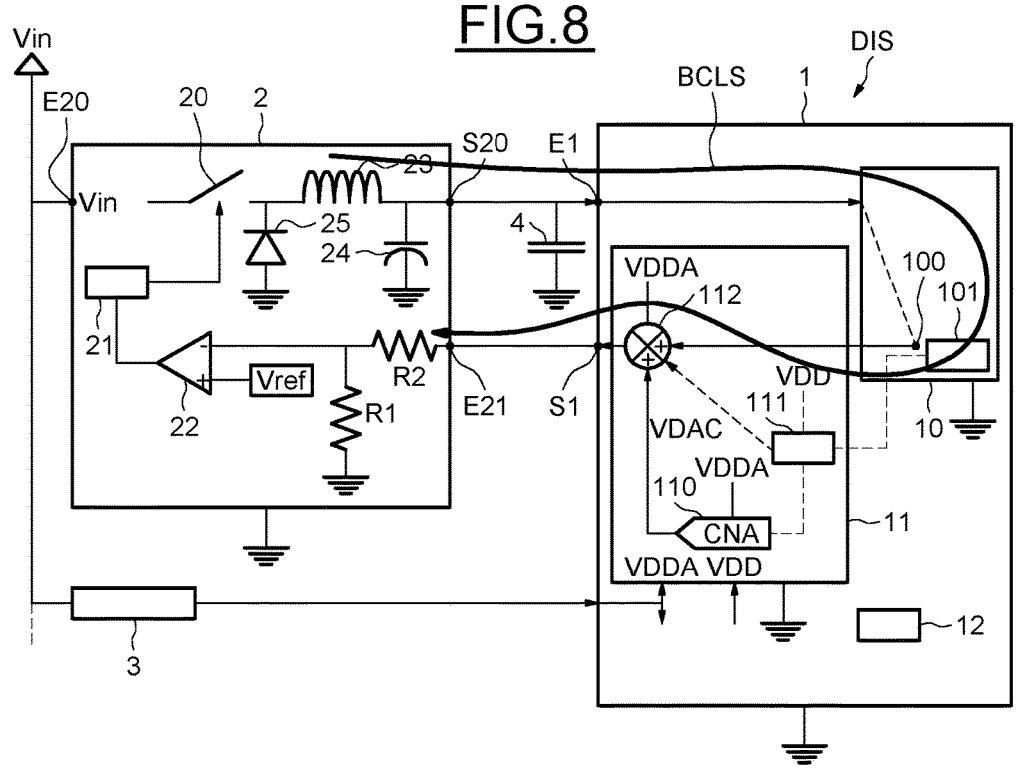

The sequence of operations of the power-up phase is analogous to that described with reference to FIG. 4, the regulation being applied according to the temporary loop BCLS in FIG. 8.

More precisely, the voltage VDD_CPU_pu satisfies the equation (9) hereinabove. When all the regulators of the device are operational and the reset pin of the system-on-a-chip is disabled, the boot sequence for the system-on-a-chip can commence and reset the voltage adaptation circuit 11 by sending the setpoint signal SC corresponding to a desired regulated power supply voltage.

The control block 111 then opens the switch 1124 which renders the adder 112 operational.

Figure 7:
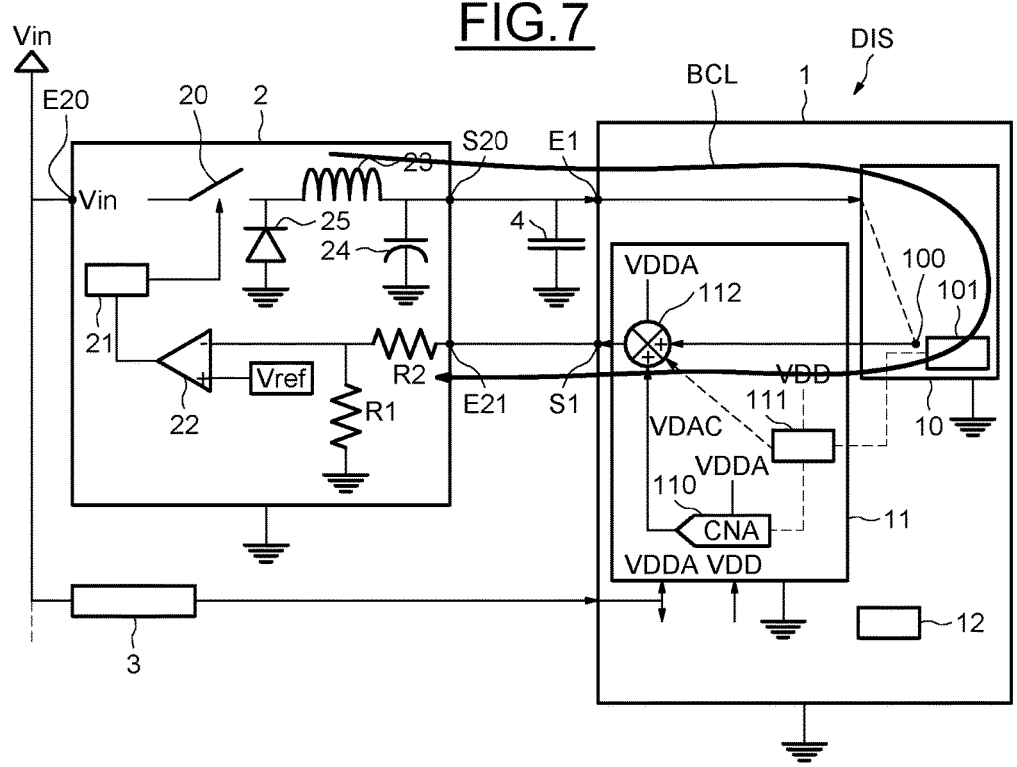

The closed-loop regulation sequence illustrated in FIG. 7 can then be applied as described hereinbefore.

Figure 9:
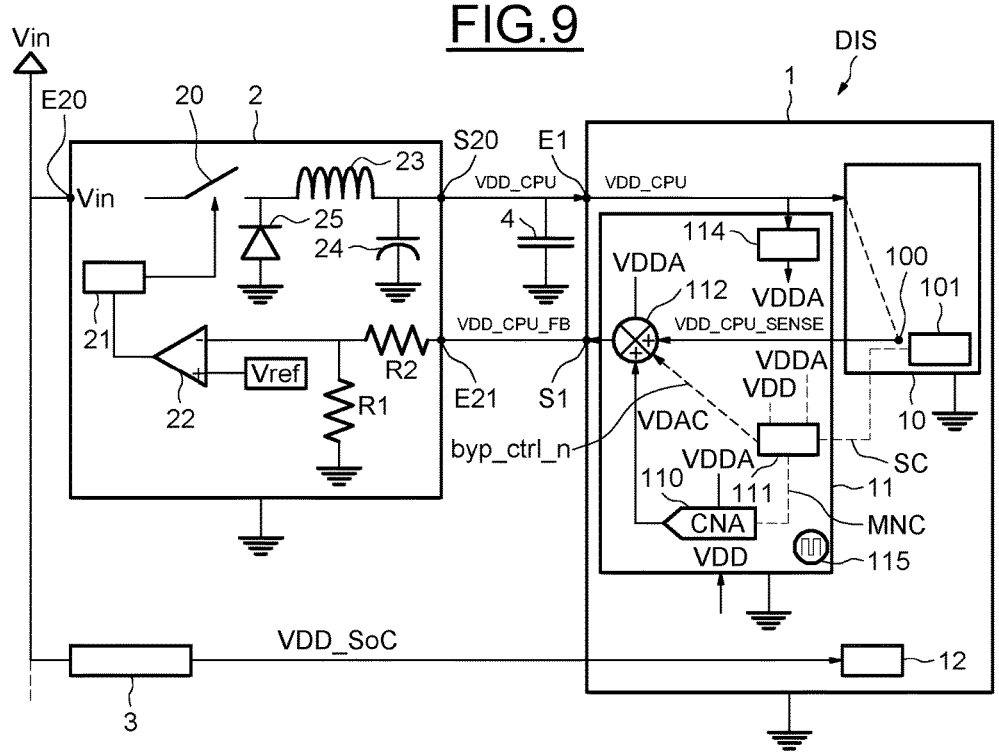
Figure 10:
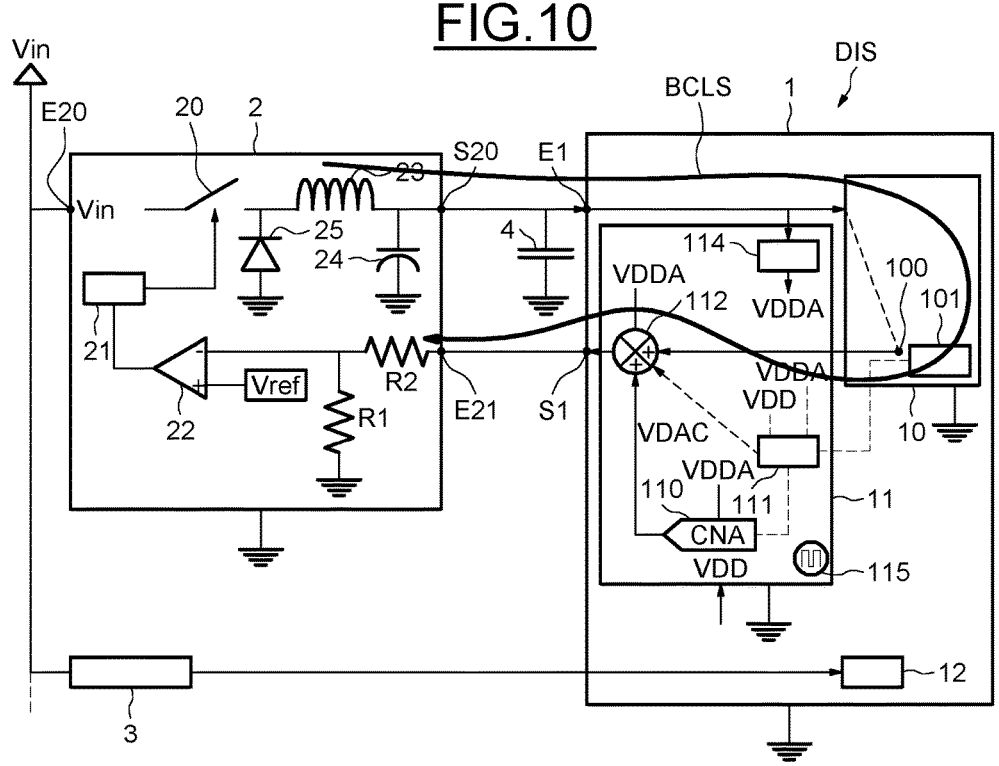
Figure 11:
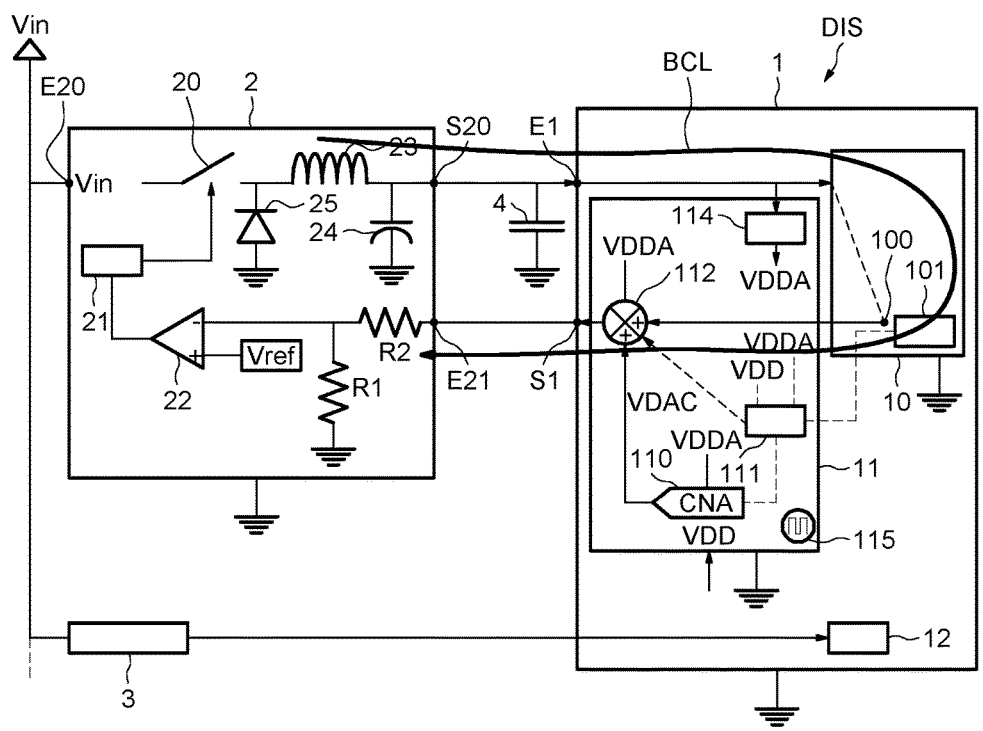

Reference is now made more particularly to FIGS. 9 to 11 in order to illustrate a third embodiment of the device.

As illustrated in FIG. 9, this third embodiment differs from the second embodiment of FIG. 5 by the fact that the voltage adaptation circuit 11 furthermore comprises auto-power supply means for this circuit.

Furthermore the others modules 12 of the system-on-a-chip are powered by the voltage VDD_SOC delivered by the regulator 3.

The auto-power supply means here comprise a voltage step-up switch-mode converter 114 powered by the power supply voltage VDD_CPU present on the input E1.

This converter then increases the voltage in order to deliver the analog voltage VDDA.

Furthermore, the voltage adaptation circuit comprises a clock signal generator 115 which is active during the power-up phase of the device and which supplies a clock signal to the control block 111 at least until the clock signal of the system-on-a-chip is available.

Here again, during the power-up phase, the adder 112 is "shunted" by the switch 1124 (FIG. 6).

The regulation is carried out according to the temporary loop BCLS in FIG. 10. The initialization sequence is analogous to that described with reference to the preceding embodiment with the following differences.

As soon as the voltage VDD_CPU appears, the converter 114 starts up and the voltage VDDA is established which allows the adder 112, the digital-analog converter 110, the control block 111 and the generator 115 to be powered.

The clock generator 115 starts up and is allowed to stabilize. The signal known by those skilled in the art under the acronym POR (Power On Reset) is disabled.

The state machine of the control block 111 then resets the digital-analog converter 110 and fixes its output voltage at a predefined value, for example 50% of the voltage excursion.

Furthermore, the control block 111 opens the switch 1124.

From now on, the voltage regulation can operate according to the loop BCL in FIG. 11 in a manner analogous to what has been described hereinbefore.

The invention is not limited to the embodiments and their implementation which have just been described but encompasses all their variants.

Thus, various types of voltages regulators are possible. Similarly, various implementations (differential, common mode, etc.) are possible for the voltage adaptation circuit 11.

The invention claimed is:

1. A method for powering a module incorporated within a system-on-a-chip, comprising, in a steady-state power supply phase:
   supplying to the module a regulated power supply voltage obtained from a feedback control loop receiving a main power supply voltage and a negative feedback voltage, and
   generating the negative feedback voltage inside the system-on-a-chip starting from an effective supply voltage of the module and from a setpoint signal corresponding to a desired regulated power supply voltage,
   wherein generating the negative feedback voltage comprises:
      converting a setpoint digital word taken from the setpoint signal into a voltage offset analog signal; and
      adding the voltage offset analog signal to the effective supply voltage to produce the negative feedback voltage.

2. The method according to claim 1, further comprising, in a power-up phase of the system-on-a-chip, avoiding making the regulation operate in open loop mode.

3. The method according to claim 2, wherein avoiding comprises:
   placing into high impedance a setpoint output of the system-on-a-chip configured to deliver the negative feedback voltage in steady-state mode, and
   establishing a temporary feedback control loop using a resistor connected between a power supply input of the system-on-a-chip receiving the regulated power supply voltage and the setpoint output.

4. The method according to claim 3, further comprising placing the setpoint output into low impedance during the transition between the power-up phase and the steady-state power supply phase so as to re-establish the feedback control loop going via the system-on-a-chip.

5. The method according to claim 2, further comprising, in the power-up phase, directly delivering the effective supply voltage to a setpoint output of the system-on-a-chip configured to deliver the negative feedback voltage in steady-state mode.

6. An electronic device, comprising:
   a system-on-a-chip, comprising:
      a power supply input configured to receive a regulated power supply voltage,
      a circuit module configured to be powered by the regulated power supply voltage,
      a controller configured to generate a setpoint signal corresponding to a desired regulated power supply voltage for the circuit module,
      a voltage adaptation circuit configured to generate a negative feedback voltage starting from an effective supply voltage of the module and from the setpoint signal, and
      a setpoint output configured to deliver the negative feedback voltage,
   a voltage regulator, comprising:
      a regulation output coupled to the power supply input, and
      a negative feedback input coupled to the setpoint output,
   wherein the voltage regulator is configured to deliver the regulated power supply voltage to the regulation output starting from a main power supply voltage and from the negative feedback voltage; and wherein the voltage adaptation circuit comprises:
a digital-analog converter configured to deliver, in the presence of a setpoint digital word taken from the setpoint signal, a voltage offset analog signal; and
an adder circuit configured to add the voltage offset analog signal to the effective supply voltage to generate the negative feedback voltage.

7. The device according to claim 6, wherein the voltage regulator is a switch-mode regulator comprising:
a switching circuit connected between a main input for receiving the main power supply voltage and the regulation output, and
a comparator generating a control signal for controlling the switching circuit using a comparator having a first comparator input designed to be connected to a reference voltage and a second comparator input coupled to the negative feedback input via a divider circuit.

8. The device according to claim 6, further comprising a protection circuit configured to avoid, when the system-on-a-chip is powered up, an operation of the voltage regulator in an open loop mode.

9. The device according to claim 8, wherein the protection circuit comprises a controllable switch configured for shunting the adder circuit in such a manner as to deliver the effective supply voltage to the setpoint output as long as the voltage adaptation circuit is not powered.

10. The device according to claim 6, further comprising an auto-power supply for the voltage adaptation circuit.

11. The device according to claim 10, further comprising a controllable switch configured for shunting the adder circuit so as to deliver the effective supply voltage to the setpoint output when the conversion circuit is not powered.

12. A device, comprising:
a voltage regulator circuit having a regulated voltage output and an input configured to receive a feedback control voltage, the voltage regulator circuit generating a regulated voltage at the regulated voltage output in response to the feedback control voltage;
an application circuit powered by the regulated voltage, said application circuit including:
a processor executing an application configured to output a setpoint signal indicative of a desired supply voltage for the processor;
a sense circuit configured to sense an actual supply voltage for the processor; and
a conversion circuit configured to generate said feedback control voltage in response to the sensed actual supply voltage and the setpoint signal;
wherein said conversion circuit comprises:
an analog to digital converter configured to convert the setpoint signal to an offset voltage; and
an adder circuit configured to add the offset voltage to the sensed actual supply voltage to generate said feedback control voltage.

13. The device of claim 12, wherein the voltage regulator circuit comprises:
a comparator configured to compare a voltage derived from the feedback control voltage to a reference voltage;
control logic configured to generate a switch control signal from an output of the comparator; and
a switch coupled between a supply source and the regulated voltage output, said switch selectively actuated in response to said switch control signal.

\* \* \* \* \*